(12) United States Patent
Rhyu

(10) Patent No.: US 7,986,944 B2
(45) Date of Patent: Jul. 26, 2011

(54) APPARATUS AND METHOD FOR RECEIVING CONTENT RIGHTS THROUGH MULTIMEDIA MESSAGE IN MOBILE COMMUNICATION TERMINAL

(75) Inventor: Eun-Hui Rhyu, Seoul (KR)

(73) Assignee: Samsung Electronics Co., Ltd (KR)

( * ) Notice: Subject to any disclaimer, the term of this patent is extended or adjusted under 35 U.S.C. 154(b) by 975 days.

(21) Appl. No.: 11/859,494

(22) Filed: Sep. 21, 2007

(65) Prior Publication Data

US 2008/0076458 A1    Mar. 27, 2008

(30) Foreign Application Priority Data

Sep. 21, 2006    (KR) .................. 10-2006-0091532

(51) Int. Cl.
*H04M 11/10* (2006.01)

(52) U.S. Cl. .................. 455/414.1; 455/418; 455/550.1; 709/219; 380/277

(58) Field of Classification Search ............... 455/414.1, 455/550.1, 418; 709/219; 380/277
See application file for complete search history.

(56) References Cited

U.S. PATENT DOCUMENTS

| 7,428,307 | B2 * | 9/2008 | Hori et al. | 380/277 |
| 7,650,630 | B2 * | 1/2010 | Yamada et al. | 726/4 |
| 2003/0105835 | A1 * | 6/2003 | Hori et al. | 709/219 |
| 2008/0046373 | A1 | 2/2008 | Kim | |

FOREIGN PATENT DOCUMENTS

| EP | 1 633 122 | 3/2006 |
| KR | 1020040070961 | 8/2004 |
| KR | 1020040093583 | 11/2004 |
| KR | 1020070024132 | 3/2007 |

OTHER PUBLICATIONS

Digital Rights Management Version 1.0, Open Mobile Alliance, 2004.
Lee et al., A DRM Framework for Secure Distribution of Mobile Contents, 2004.
Now.SMS: NowSMS and OMA Digital Rights Management (DRM), Feb. 27, 2006.
Liong et al., Digital Rights Management for the Mobile Internet, Wireless Personal Communications, vol. 29, Apr. 2004.

* cited by examiner

*Primary Examiner* — Danh C Le
(74) *Attorney, Agent, or Firm* — The Farrell Law Firm, P.C.

(57) ABSTRACT

Provided are an apparatus and a method for receiving content rights through a multimedia message in a mobile communication terminal. The apparatus includes a content server transmitting contents and a Right Object (RO) of the contents to a Multimedia Messaging System (MMS) server; the MMS server receiving the contents and the RO from the convent server, attaching the RO to a protection part of the multimedia message including the contents, and transmitting the RO along with the contents; and a mobile communication terminal receiving the multimedia message including the contents and the RO from the MMS server and decoding and executing the contents using the RO.

15 Claims, 5 Drawing Sheets

APPARATUS AND METHOD FOR RECEIVING CONTENT RIGHTS THROUGH MULTIMEDIA MESSAGE IN MOBILE COMMUNICATION TERMINAL

PRIORITY

This application claims priority under 35 U.S.C. §119 to an application filed in the Korean Intellectual Property Office on Sep. 21, 2006, entitled "Apparatus and Method for Receiving Content Rights Through Multimedia Message in Mobile Communication Terminal" and assigned Serial No. 2006-91532, the contents of which are incorporated herein by reference.

BACKGROUND OF THE INVENTION

1. Field of the Invention

The present invention relates generally to an apparatus and a method for receiving content rights through a multimedia message in a mobile communication terminal, and in particular, to an apparatus and a method for receiving attached contents along with a protected right object (RO) through a multimedia message in a mobile communication terminal.

2. Description of the Related Art

Digital rights management (DRM) has been briskly studied, and commercial services adopting DRM have been introduced or are being introduced. DRM refers to technology for protecting digital contents, which can be easily counterfeited and distributed without permission.

In the prior art efforts have been made to protect digital contents but focus on the prevention of disapproved or unauthorized access to the digital contents. For example, access to digital contents is allowed to only users who have paid charges but disallowed to users who have not paid charges. However, digital contents can be easily reused, processed, counterfeited, and distributed in terms of characteristics of digital data. Therefore, if a user who has paid charges and accesses the digital contents the counterfeits or distributes the digital contents without permission, users who have not paid charges may use the digital contents.

In order to solve the above problem, DRM is employed to encrypt and distribute digital contents and provide a license called a Right Object (RO) necessary for using the encrypted digital contents.

FIG. 1 illustrates a conventional mobile communication system for providing digital contents. Referring to FIG. 1, terminals 122, 124, 126 desiring digital contents may obtain desired digital contents from content servers 112, 114, and 116. Here, since the digital contents provided by content servers 112, 114, and 116 are encrypted, terminals 122, 124, and 126 require ROs to use the encrypted digital contents (hereinafter, contents).

Terminals 122, 124, and 126 may pay fixed charges to obtain the ROs including rights to execute the contents from an RO issuing server 130. The rights included in the ROs may be content encryption keys necessary for decoding the contents. Here, RO issuing server 130 reports specifications of issuing of the ROs to content severs 112, 114, and 116. If necessary, RO issuing server 130 and content servers 112, 114, and 116 may be the same subject. Terminals 122, 124, and 126, which have obtained the ROs, use the contents using the ROs.

As described with reference to FIG. 1, an RO is generally not attached to a message but transmitted separately from contents attached to the message. Thus, a user must receive the contents and then request and receive the RO.

If contents and an RO are attached to a message and then transmitted, the RO may be easily open-ended by a user. Thus, the user may attach the RO to the message and then transmit the RO to another user without permission. As a result, a content server may not obtain a just right to the contents. Therefore, the RO must not be attached to the message along with the contents but transmitted separately from the contents.

A format of a message transmitted from a Multimedia Messaging System (MMS) will now be described with reference to FIG. 2, and the message is referred to as a multimedia message in the present invention.

FIG. 2 illustrates the format of a conventional multimedia message. Referring to FIG. 2, the conventional multimedia message includes a message header 210 and a message body 220.

The message header 210 includes presentation position information 212 designating a presentation part 222. Message body 220 includes presentation part 222 and a content part 224 including contents.

Presentation part 222 includes only information indicating that each of the contents is to be output on how many pages in what second in which position of a display, i.e., only information which is not to be output to a user. Presentation part 222 is not recognized as an attached part in the multimedia message.

SUMMARY OF THE INVENTION

An aspect of the present invention is to solve at least the above problems and/or disadvantages and to provide at least the advantages below. Accordingly, an aspect of the present invention is to provide an apparatus and a method for receiving content rights through a multimedia message in a mobile communication terminal.

Another aspect of the present invention is to provide an apparatus and a method for receiving attached contents along with a protected Right Object (RO) through a multimedia message in a mobile communication terminal.

A further aspect of the present invention is to provide an apparatus and a method for attaching a protected RO to a presentation part of a multimedia message allowing a user to receive the attached contents along with the protected RO through the multimedia message in a mobile communication terminal.

According to one aspect of the present invention, there is provided a mobile communication system transmitting and receiving content rights through a multimedia message, including a content server transmitting contents and an RO of the contents to a Multimedia Messaging System (MMS) server; the MMS server receiving the contents and the RO from the convent server, attaching the RO to a protection part of the multimedia message including the contents, and transmitting the RO along with the contents; and a mobile communication terminal receiving the multimedia message including the contents and the RO from the MMS server and decoding and executing the contents using the RO.

According to another aspect of the present invention, there is provided an apparatus for receiving content rights through a multimedia message in a mobile communication terminal, including a communicator for receiving the multimedia message including contents and an RO of the contents from an MMS server; an RO extractor for checking whether the multimedia message received through the communicator includes the RO, and if the multimedia message includes the RO, extracting the RO from the multimedia message; a content decoder for decoding the contents using the RO extracted by the RO extractor; and a content executor executing the contents decoded by the content decoder.

According to a further aspect of the present invention, there is provided a method for receiving content rights through a multimedia message in a mobile communication terminal, including receiving the multimedia message including contents and an RO of the contents from an MMS server; extracting the RO from the multimedia message; decoding the contents using the extracted RO; and executing the decoded contents.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and a method for attaching a protected RO to a presentation part of a multimedia message allowing a user to receive the attached contents along with the protected RO through the multimedia message in a mobile communication terminal.

Figure 1:
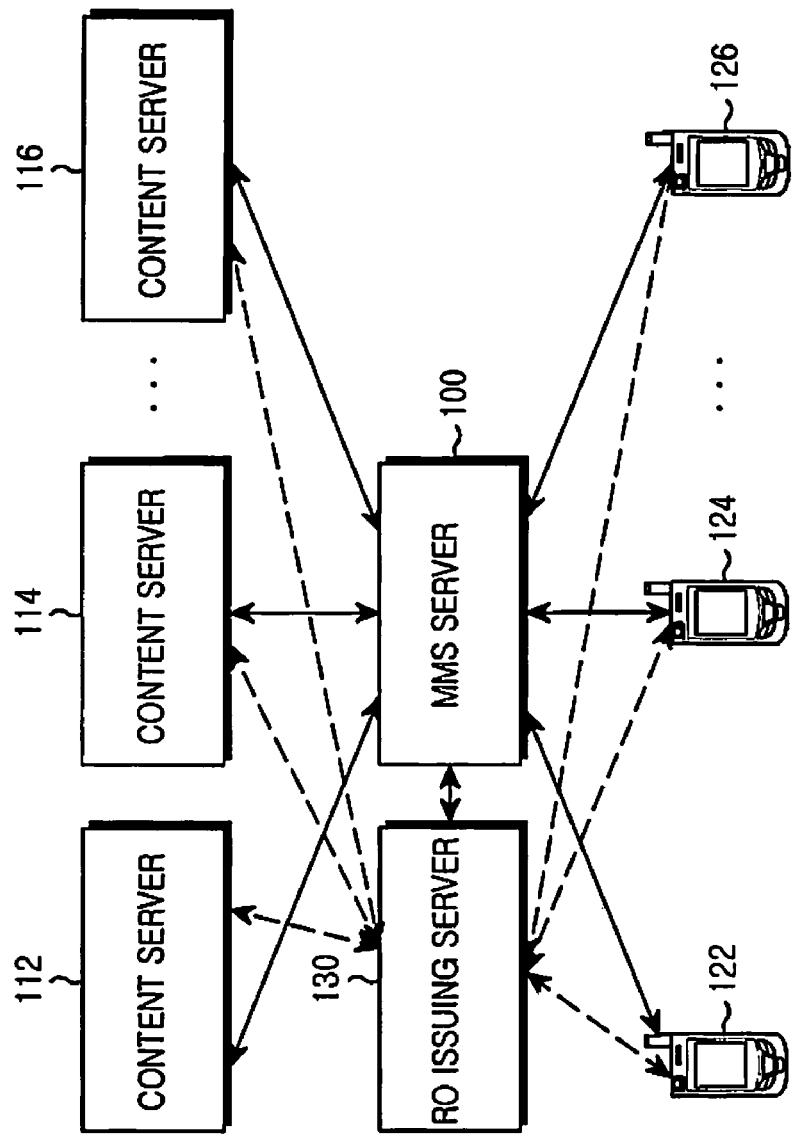
FIG. 1 illustrates a conventional mobile communication system for providing digital contents.
Figure 2:
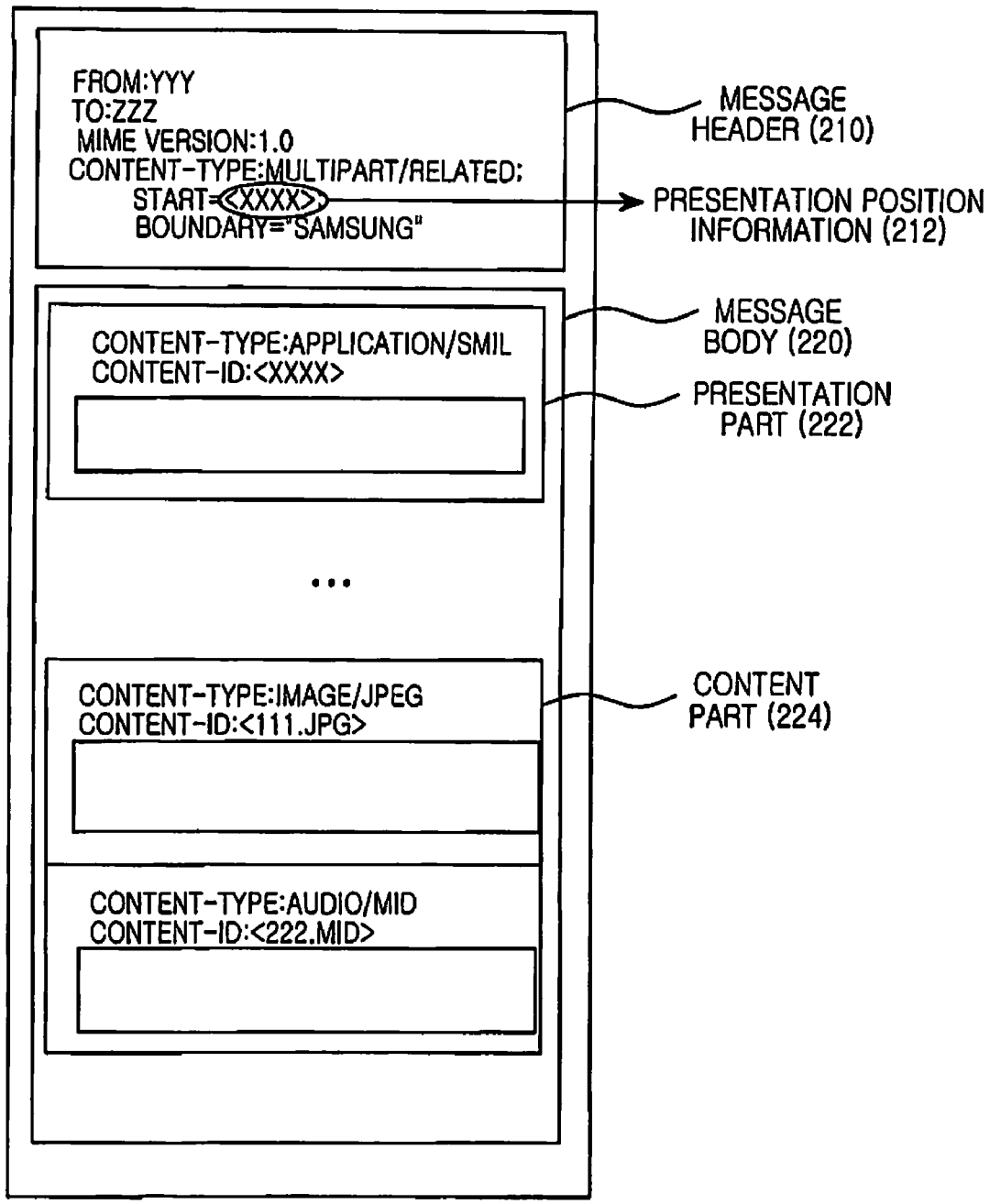
FIG. 2 illustrates the format of a conventional multimedia message.
Figure 3:
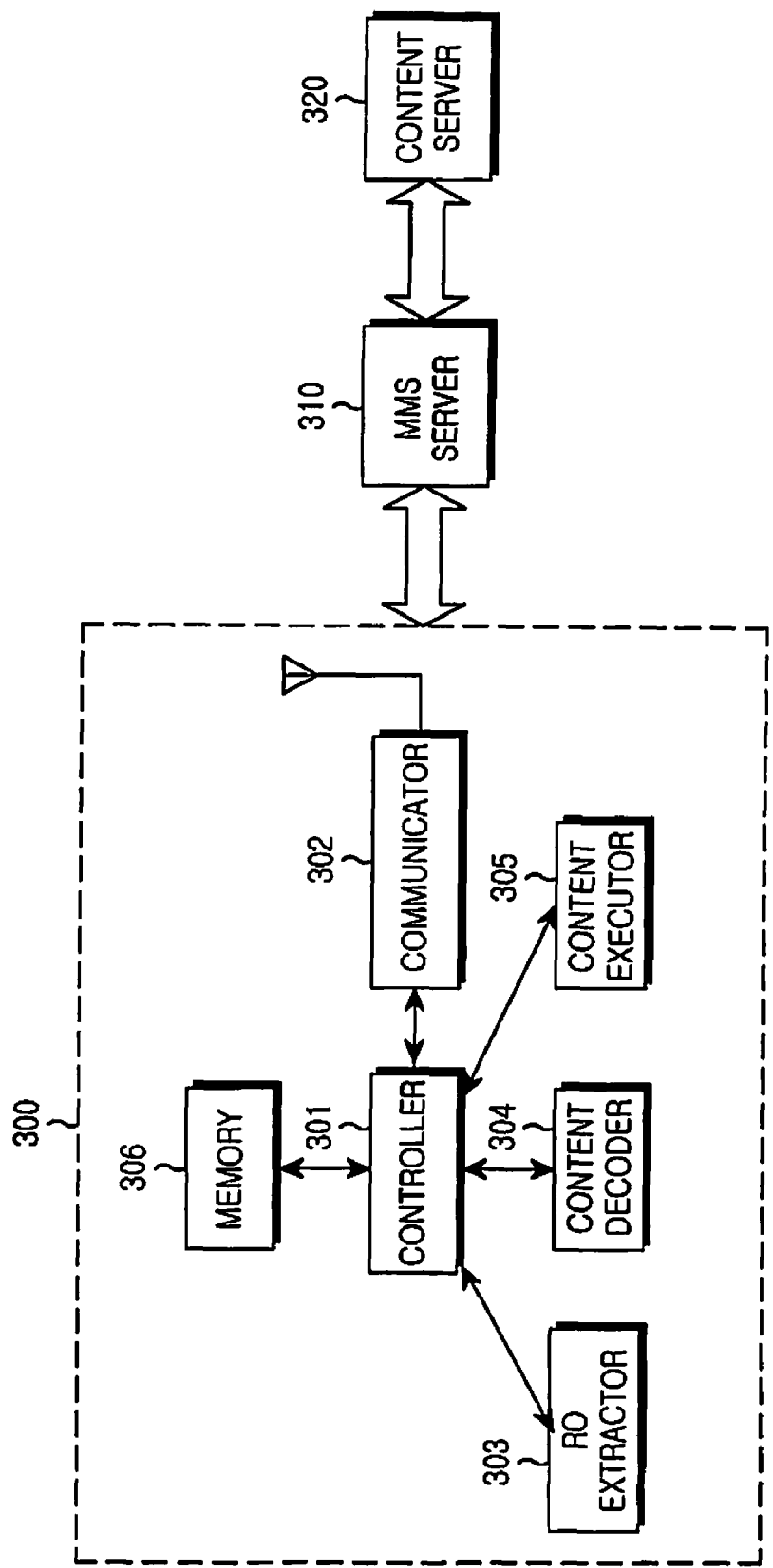
FIG. 3 is a block diagram of an apparatus for receiving content rights through a multimedia message in a mobile communication terminal according to the present invention.

Referring to FIG. 3, a mobile communication terminal 300 includes a controller 301, a communicator 302, a right object (RO) extractor 303, a content decoder 304, a content executer 305, and a memory 306.

Communicator 302 downconverts a radio frequency (RF) signal received through an antenna (not shown) and then performs despreading and channel decoding on the RF signal during reception. Communicator 302 performs channel coding and spreading on the RF signal, upconverts the RF signal, and transmits the upconverted RF signal through the antenna during transmission. According to the present invention, controller 301 controls communicator 302 to receive a multimedia message including a protected RO from a Multimedia Messaging System (MMS) server 310, besides the above-described normal function.

RO extractor 303 checks whether the multimedia message received through communicator 302 includes the protected RO, and if the multimedia message includes the protected RO, extracts the protected RO from the multimedia message. Thereafter, RO extractor 303 stores the extracted protected RO in memory 306 and provides the extracted protected RO to content decoder 304.

Content decoder 304 decodes contents of the received multimedia message using the RO extracted by RO extractor 303 and provides the decoded contents to content executor 305. The RO extracted from the multimedia message may be encrypted to be decoded only in mobile communication terminal 300 using a forward-locking or public key encryption method. If the RO is encrypted, content decoder 304 decodes the RO before decoding the contents.

Content executor 305 executes the decoded contents provided from content decoder 304.

Memory 306 stores the RO extracted by the RO extractor 303. Here, the stored RO may be output or may not be provided according to a request of a user.

Controller 301 controls RO extractor 303, content decoder 304, and content executor 305. In other words, controller 301 may perform functions of RO extractor 303, content decoder 304, and content executor 305. RO extractor 303, content decoder 304, and content executor 305 are separately constituted in the present invention to separately describe their functions. Thus, mobile communication terminal 300 may be substantially constituted so that controller 301 processes all or some of the functions of RO extractor 303, content decoder 304, and content executor 305.

MMS server 310, which transmits the multimedia message including the protected RO, receives the contents and the RO of the contents from a content server 320. MMS server 310 attaches the contents to a content part of the multimedia message, attaches the RO to the presentation part, which is not output to a user of mobile communicator terminal 300, and transmits the contents along with the RO to mobile communication terminal 300. Content server 320 encrypts the RO and then transmits the encrypted RO to MMS server 310 using a forward-locking or public key encryption method, so that the encrypted RO is decoded only in mobile communication terminal 300.

Figure 4:
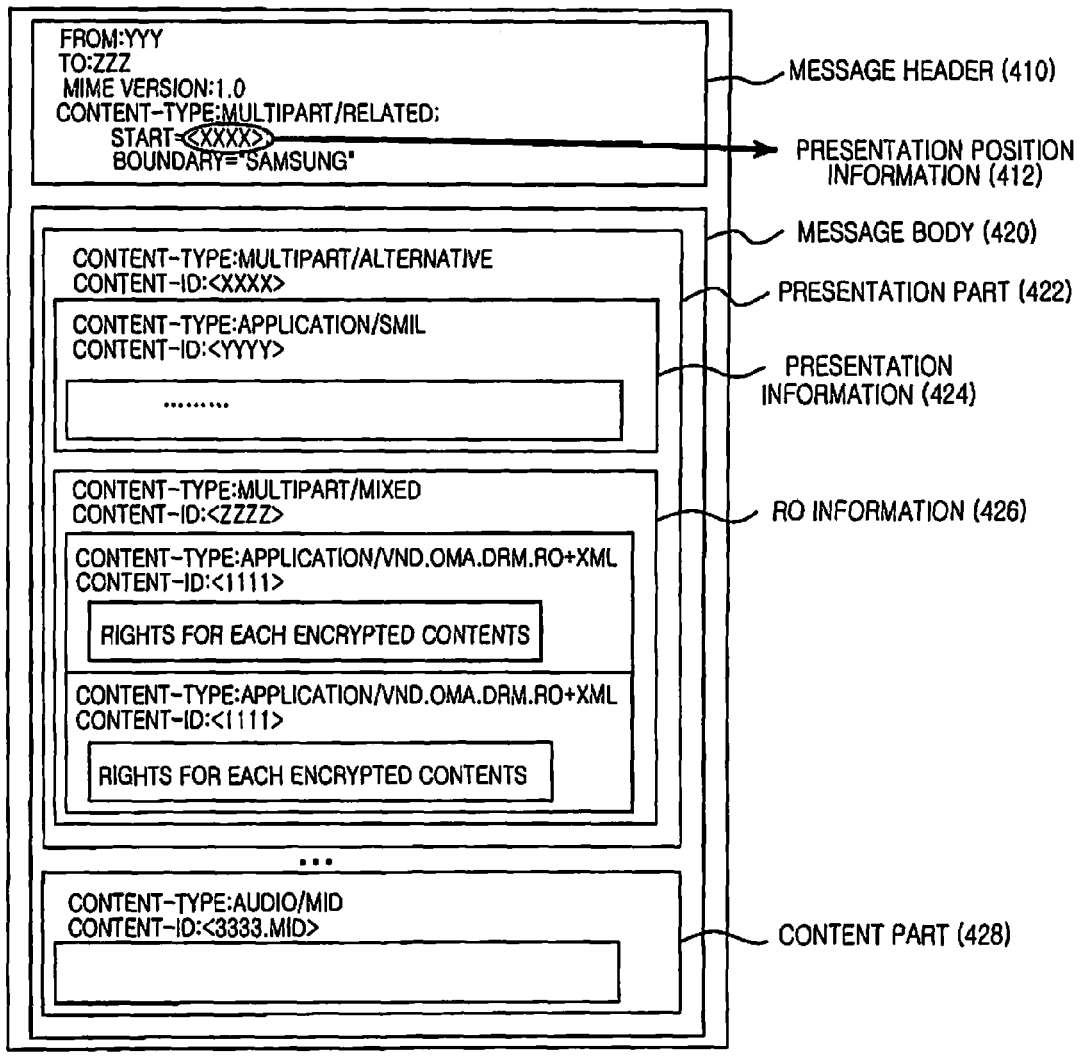
FIG. 4 illustrates the format of a multimedia message including a right object (RO) of contents according to the present invention.

Referring to FIG. 4, the multimedia message according to the present preferred embodiment includes a message header 410 and a message body 420.

Message header 410 includes presentation position information 412 designating a presentation part 422. Message body 420 includes presentation part 422 and a content part 428 including contents.

Presentation part 422 includes presentation information 424 indicating the number of pages, the time and position that each of the contents is to be output on a display. Presentation part 422 may additionally include RO information 426. If the presentation part 422 additionally includes the RO information 426, a format of presentation part 422 will be defined as "Content-type: multipart/alternative." Presentation information 424 and RO information 426 of presentation part 422 are not output to a user.

A method of receiving content rights through a multimedia message in a mobile communication terminal having the above-described structure will now be described with reference to FIG. 5.

Figure 5:
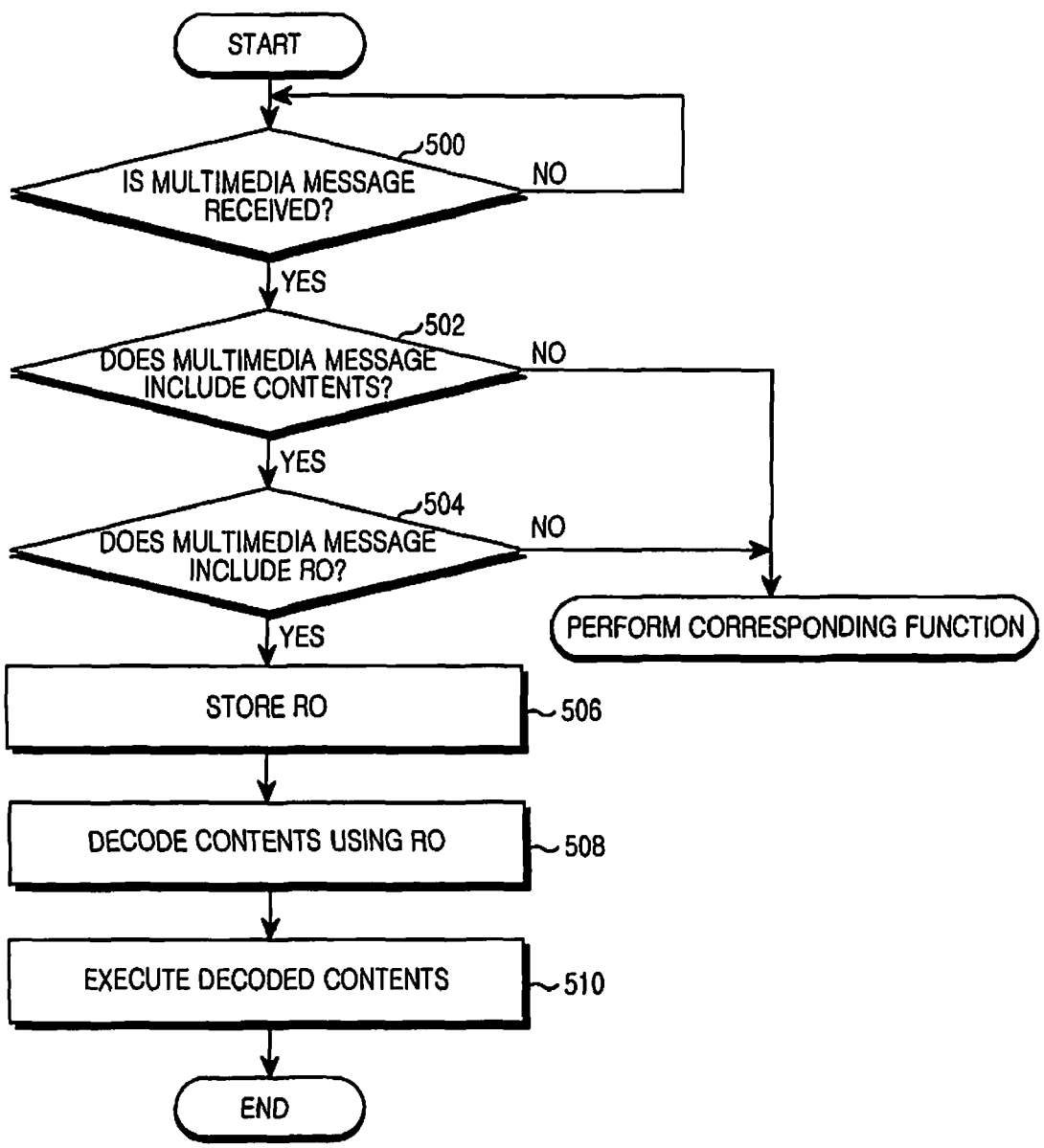
FIG. 5 is a flowchart of a procedure for receiving content rights through a multimedia message in a mobile communication terminal according to the present invention.

Referring to FIG. 5, in step 500, a mobile communication terminal of the present invention checks whether a multimedia message is received. If the multimedia message is received, the mobile communication terminal proceeds to step 502 to check whether contents are attached to the multimedia message. If the contents are not attached to the multimedia message, the mobile communication terminal performs a corresponding function, which the mobile communication terminal was performing.

If the contents are attached to the multimedia message, the mobile communication terminal goes to step 504 to check whether a presentation part of the multimedia message includes a protected RO. If the presentation part of the multimedia message does not include the protected RO, the mobile communication terminal performs the corresponding function, which the mobile communication terminal was performing If the presentation part of the multimedia message includes the protected RO, the mobile communication terminal proceeds to step 506 to extract the protected RO from the multimedia message and store the extracted protected RO. In step 508, the mobile communication terminal decodes the contents attached to the multimedia message using the protected RO. In step 510, the mobile communication terminal executes the decoded contents.

In accordance with the present invention as described above, provided are an apparatus and a method for attaching a protected RO to a presentation part of a multimedia message to receive attached contents along with the protected RO through the multimedia message in a mobile communication terminal. Therefore, the RO can be provided together with the contents to reduce processes performed by a user to obtain the RO.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as further defined by the attached claims.

What is claimed is:

1. A mobile communication system transmitting and receiving content rights through a multimedia message, comprising:
   a content server transmitting contents and a Right Object (RO) of the contents to a Multimedia Messaging System (MMS) server;
   the MMS server receiving the contents and the RO from the content server, attaching the RO to a protection part of the multimedia message including the contents, and transmitting the RO along with the contents; and
   a mobile communication terminal decoding and executing the contents using the RO, when receiving the multimedia message including the contents and RO from the MMS server.

2. The mobile communication system of claim 1, wherein the content server forward-locks or encrypts the RO and then transmits the RO to the MMS server, so that the RO is decoded only in the mobile communication terminal.

3. The mobile communication system of claim 1, wherein the MMS server defines the protection part of the multimedia message including the RO as a presentation part of the multimedia message.

4. An apparatus for receiving content rights through a multimedia message in a mobile communication terminal, comprising:
   a communicator receiving the multimedia message including a Right Object (RO) attached to a protection part of the multimedia message including contents from an MMS server;
   an RO extractor checking whether the multimedia message received through the communicator includes the RO, and when the multimedia message includes the RO, extracting the RO from the multimedia message;
   a content decoder decoding the contents using the RO extracted by the RO extractor; and
   a content executor executing the contents decoded by the content decoder.

5. The apparatus of claim 4, wherein the RO is forward-locked or encrypted.

6. The apparatus of claim 5, wherein if the RO is encrypted, the content decoder decodes the RO before decoding the contents.

7. The apparatus of claim 4, wherein the RO is attached to a presentation part of the multimedia message.

8. The apparatus of claim 4, wherein the MMS server receives the contents and the RO from the content server, attaches the RO to the presentation part as a protection part of the multimedia message including the contents, and transmits the RO along with the contents.

9. A method of receiving content rights through a multimedia message in a mobile communication terminal, comprising:
   receiving the multimedia message including a Right Object (RO) attached to a protection part of the multimedia message including contents from an MMS server;
   extracting the RO from the multimedia message;
   decoding the contents using the extracted RO; and
   executing the decoded contents.

10. The method of claim 9, further comprising decoding the RO before decoding the contents if the RO is encrypted.

11. The method of claim 9, wherein the RO is forward-locked or encrypted.

12. The method of claim 9, wherein the RO is attached to a presentation part of the multimedia message.

13. The method of claim 9, wherein the MMS server receives the contents and the RO from the content server, attaches the RO to the presentation part as a protection part of the multimedia message including the contents, and transmits the RO along with the contents.

14. A mobile communication terminal for receiving content rights through a multimedia message, comprising:
   means for receiving the multimedia message including a Right Object (RO) attached to a protection part of the multimedia message including contents from an MMS server;
   means for extracting the RO from the multimedia message;
   means for decoding the contents using the extracted RO; and
   means for executing the decoded contents.

15. A non-transitory computer-readable recording medium having recorded thereon a program for receiving content rights through a multimedia message in a mobile communication terminal, comprising:
   a first code segment, for receiving the multimedia message including a Right Object (RO) attached to a protection part of the multimedia message including contents from an MMS server;
   a second code segment, for extracting the RO from the multimedia message;
   a third code segment, for decoding the contents using the extracted RO; and
   a fourth code segment, for executing the decoded contents.

* * * * *